Jan. 30, 1923.
H. G. WEYMOUTH.
BRAKE.
FILED OCT. 6, 1920.
1,443,775.
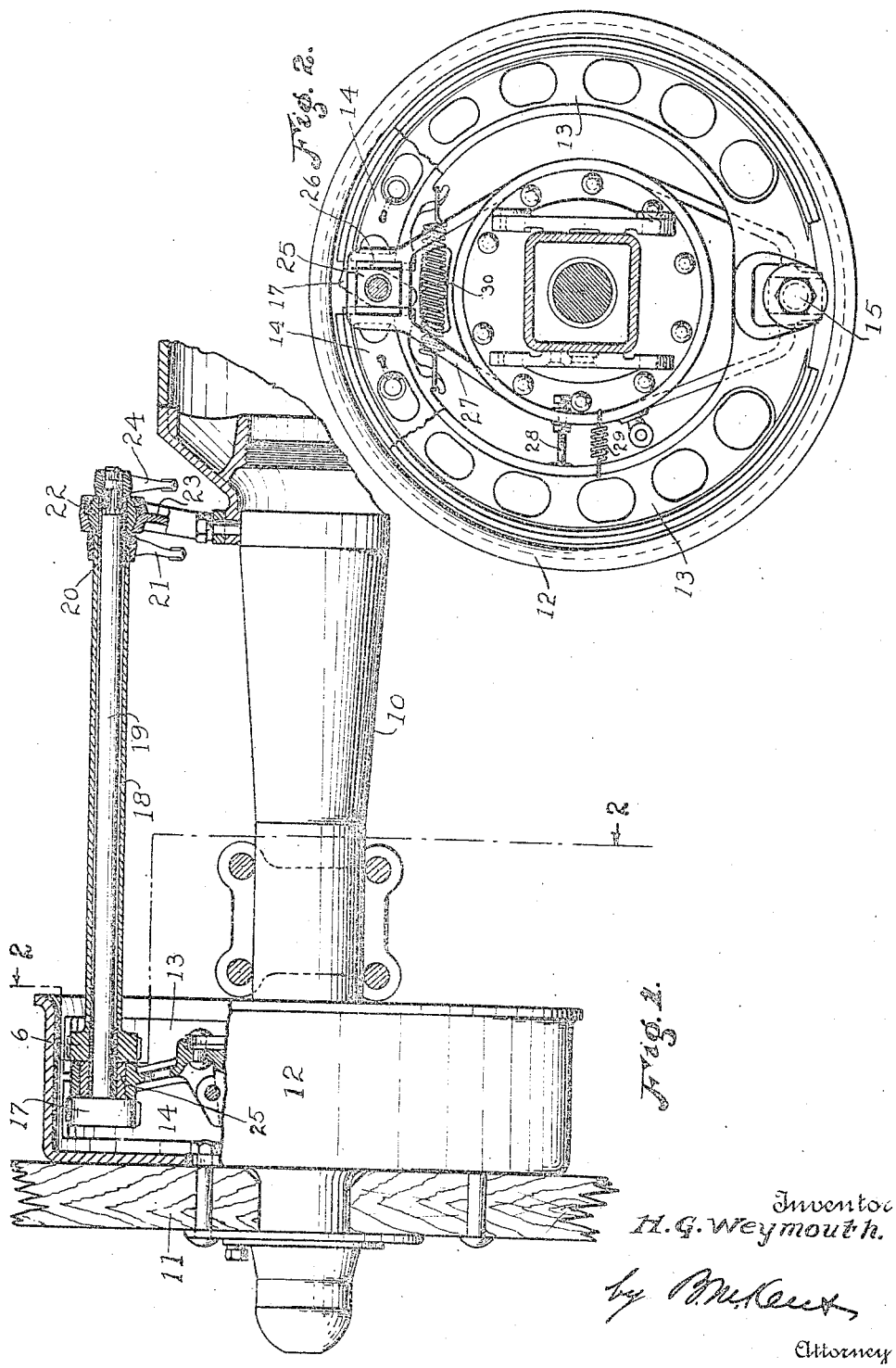
Inventor
H. G. Weymouth.
by McKent
Attorney Patented Jan. 30, 1923.

1,443,775

UNITED STATES PATENT OFFICE.

HARRY G. WEYMOUTH, OF CLEVELAND, OHIO, ASSIGNOR TO THE STANDARD PARTS COMPANY, OF CLEVELAND, OHIO, A CORPORATION OF OHIO.

BRAKE.

Application filed October 6, 1920. Serial No. 415,084.

*To all whom it may concern:*

Be it known that I, HARRY G. WEYMOUTH, a citizen of the United States, and a resident of Cleveland, county of Cuyahoga, State of Ohio, have invented certain new and useful Improvements in Brakes, of which the following is a specification.

This invention relates to brake mechanisms and more particularly to the mounting for an actuating shaft therefor. The object of the invention is to provide adjustable supports for the shaft bearings, which will permit the shaft to align itself so as to provide for the uniform application of the brake.

One embodiment of the invention is illustrated in the accompanying drawing, of which:

Figure 1 is a fragmentary plan view, partially in section, of a motor vehicle axle; and Fig. 2 is a section on the line 2—2 of Fig. 1.

Referring to the drawings, 10 indicates the axle housing and 11 a wheel at the end thereof. The wheel 11 carries the usual brake drum 12, with the interior of which two pairs of brake shoes 13 and 14, respectively, cooperate. The usual anchorage 15 is provided for the brakes, and the brake shoes 13 are actuated by a cam 16 and the brake shoes 14 are actuated by the cam 17, in the usual manner. The cam 16 is actuated by the tubular shaft 18 within which there is arranged a shaft 19 which actuates the cam 17, this construction being common in motor vehicle brake arrangement. The shaft 18 has a bearing at the point 20 on the shaft 19 and is actuated by means of an arm 21. The shaft 19 is mounted in a block 22, which is shown as provided with a spherical outer surface, so as to have universal movement in the relatively stationary support 23. The shaft 19 may be actuated by an arm 24 arranged at one end thereof, and the opposite end is supported in a bearing block 25 arranged between the cams 16 and 17. The block 25 is preferably formed with a rectangular exterior, which is arranged in an opening 26 in the relatively fixed support 27. The block 25 fits the sides of the opening 26 so as to be held against movement radially of the axis of the brake, but the opening is elongated circumferentially so that the block may move, to a slight extent, circumferentially, to accommodate necessary circumferential movements of the cams to permit uniform application of the brake shoes. In order to prevent the parts from rattling when the brake is released, I have provided in connection with each pair of shoes an adjustable stop screw 28 on the support 27 and a spring 29 for holding one shoe of each pair 13 and 14 against its cooperating screw 28 when the brake is released. The usual springs 30 are also provided to hold the ends of the shoes against the cam 17.

By the above construction, it is possible to uniformly apply the brake shoes to the brake drum, without regard to inaccuracies of manufacture of the shoes or to the differences in wear to which they may be subjected in service, which is impossible where the bearings for the shafts 18 and 19 are rigidly and non-adjustably supported. By providing the swivel mounting for the block 22, movements of the block 25 are compensated for without liability of binding the shafts in their bearings.

While I have shown a specific brake mechanism of common construction, it will be understood that the principles of my invention are not limited to this construction. It will also be understood that the details of the mounting of the brake actuating shafts are subject to variation.

Having thus described my invention, what I claim is:

1. In brake mechanism, the combination of a brake, actuating means therefor comprising a shaft, a bearing for said shaft, and a relatively fixed support for said bearing adapted to permit the latter to move circumferentially to compensate for irregularities in the brake.

2. In brake mechanism, the combination of a brake having two adjacent ends adapted to be separated in applying the brake, means for separating said ends, a shaft for actuating said means, a bearing for said shaft, and a relatively fixed support for said bearing adapted to permit the latter to move circumferentially to permit said means to act uniformly on said ends.

3. In brake mechanism, the combination of a brake having two adjacent ends adapted to be separated in applying the brake, a cam arranged between said ends and adapted to separate them, a shaft for actuating said cam, a bearing for said shaft, and a relatively fixed support having an opening to receive said bearing, said opening being so formed as to prevent movement of said shaft radially of the brake axis and to permit slight movements circumferentially thereof.

4. In brake mechanism, the combination of a brake having two adjacent ends adapted to be separated in applying the brake, a cam arranged between said ends and adapted to separate them, a shaft for actuating said cam, a bearing for said shaft, a relatively fixed support for said bearing adapted to permit slight circumferential movement of the bearing about the axis of the brake and another bearing for said shaft adjustably supported to accommodate the movements of the first mentioned bearing.

5. In brake mechanism, the combination of a brake, actuating means therefor comprising a shaft, a plurality of bearings for said shaft, and relatively fixed supports for said bearings on which said bearings are adapted to move to permit self-alignment of said shaft in actuating said brake.

6. In brake mechanism, the combination of a brake actuating means therefor comprising a shaft, a bearing for said shaft, a relatively fixed support for said bearing on which the latter is adapted to move to permit self-alignment of said shaft in actuating said brake, and means for holding said brake against movement when in released position.

7. In brake mechanism, the combination of a brake having two parts with adjacent ends adapted to be separated in applying the brake, means for separating said ends, a shaft for actuating said means, a bearing for said shaft, a relatively fixed support for said bearing relative to which the bearing has limited movement circumferentially of the brake, a stop against which one of said parts abuts when released, and means cooperating with said stop to hold the brake against movement when released.

In testimony whereof I affix my signature.

HARRY G. WEYMOUTH.